(12) United States Patent
Schoepflin et al.

(10) Patent No.: US 7,127,564 B2
(45) Date of Patent: Oct. 24, 2006

(54) DOUBLE BUFFERED FLASH PROGRAMMING

(75) Inventors: Robert W. Schoepflin, Port Jefferson, NY (US); Richard E. Wahler, St. James, NY (US); Ronald W. Streiber, Smithtown, NY (US); John D. Virzi, Bayside, NY (US); Donald D. Noviello, Smithtown, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 281 days.

(21) Appl. No.: 10/376,838

(22) Filed: Feb. 28, 2003

(65) Prior Publication Data

US 2004/0172496 A1    Sep. 2, 2004

(51) Int. Cl.
*G06F 12/02* (2006.01)
(52) U.S. Cl. .......................... 711/150; 711/5; 711/103; 711/148; 711/149
(58) Field of Classification Search .................. 711/5, 711/103, 156, 148–150
See application file for complete search history.

(56) References Cited

U.S. PATENT DOCUMENTS

| | | | | |
|---|---|---|---|---|
| 4,320,466 A | * | 3/1982 | Myers | ........................ 711/217 |
| 5,696,917 A | | 12/1997 | Mills et al. | |
| 5,729,683 A | * | 3/1998 | Le et al. | ...................... 709/237 |
| 6,026,465 A | | 2/2000 | Mills et al. | |
| 6,246,634 B1 | | 6/2001 | Nojima | |
| 6,385,688 B1 | | 5/2002 | Mills et al. | |
| 6,457,114 B1 | * | 9/2002 | Paluch | ........................ 711/219 |
| 6,496,940 B1 | * | 12/2002 | Horst et al. | ..................... 714/4 |
| 6,564,285 B1 | | 5/2003 | Mills et al. | |

OTHER PUBLICATIONS

Mitsubishi Semiconductor—3D-RAM Architecture, Copyright 1997-2002, website address unknown.
JEDEC Solid State Technology Association, "JEDEC Standard: Common Flash Interface (CFI)," Publication No. JESD68.01, Sep. 2003, 19 pages.
JEDEC Solid State Technology Association, "JEDEC Publication: Common Flash Interface (CFI) ID Codes," Publication No. JEP137B, May 2004, 12 pages.

* cited by examiner

*Primary Examiner*—Matthew Kim
*Assistant Examiner*—Hetul Patel
(74) *Attorney, Agent, or Firm*—Meyertons Hood Kivlin Kowert & Goetzel, P.C.; Jeffrey C. Hood; Russell E. Henrichs

(57) ABSTRACT

A double buffered flash bank. In one embodiment, a flash interface may be programmed by a register interface with a first set of data while a second set of data is being written to the register interface. In one embodiment, flash banks may be programmed in parallel using latched register interfaces. For example, while data from a first register interface is being written to the first flash bank and data from a second register interface is being written to a second flash bank, new data may be written to the first register interface and to the second register interface. The new data may then be written from the first register interface to the first flash bank and from the second register interface to the second flash bank.

34 Claims, 5 Drawing Sheets

DOUBLE BUFFERED FLASH PROGRAMMING

BACKGROUND OF THE INVENTION

1. Field of the Invention

The present invention relates generally to computer system memory and specifically to flash interface in computer systems.

2. Description of the Related Art

Computer systems may use flash memory devices for storing data in a non-volatile memory medium. For example, the flash memory device may be electrically erasable programmable read-only memory (EEPROM) that uses transistors to store data without requiring power to maintain the data storage. Flash memory devices may be faster than other non-volatile memories, and therefore may be used in a firmware hub (FWH) for information storage. Flash memory devices may also be used as portable memory devices and in devices requiring quick, reliable access to data such as a basic input output system (BIOS), a memory card for a digital camera, and a memory device for a video game.

Flash memory devices may also be used when assembling computer systems to store programs on a motherboard. Programming time during computer system assembly may be critical so it may be necessary to program the chips on the motherboard as fast as possible. However, read/writes to a flash memory device may require relatively long periods of time to use in programming chips. Because conventional flash memory devices may not be read while data is being written to the flash memory device, a flash memory device may be relatively slow for use in programming chips or even in using a computer system in normal operating mode. For example, in conventional chip programming, data may be written to the flash memory device in programming mode and then read (i.e., verified). Usually, the read (or verify) process can only be done when the flash memory device is not in programming mode. Switching back and forth between programming mode can be very time consuming and therefore programming a flash memory device may be inefficient.

SUMMARY OF THE INVENTION

In one embodiment, a register interface may be coupled to a flash bank. The register interface may include a latched register. For example, the register interface may have a register coupled to a latch (such as a group of flip-flops). Other latches are also contemplated. A first address and a first set of data may be written to the register in the register interface and then transferred to the latch. In one embodiment, the first set of data may be written to the flash bank from the latch (using the first address). At least a portion of a second address and a second set of data may be written to the register interface simultaneously with the writing of the first set of data to the flash bank. Because the flash bank may be continuously programmed in this manner, a computer system using the flash bank may not need to switch the flash bank in and out of a programming mode.

In one embodiment, a first flash bank and a second flash bank may be programmed using a first register interface and a second register interface. For example, a first address and a first set of data may be written to a first register in the first register interface and also written to a first latch. The first set of data may be written out of the first latch to the first flash bank using the first address. A second address and a second set of data may be written to the first register in the first register interface. In one embodiment, at least a portion of the second address and the second set of data may be written simultaneously with the writing of the first set of data to the first flash bank from the first latch. In one embodiment, the second address and the second set of data may be written to the first latch after the first set of data is written to the first flash bank from the first latch. The second set of data may be written to the first flash bank using the second address.

A third address and a third set of data may be written to the second register in the second register interface after the first address and first set of data is written to the first register interface. In one embodiment, the third address and the third set of data may be transferred from the second register to the second latch at substantially the same time as the first address and the first set of data are transferred from the first register to the first latch. The third set of data may be written to the second flash bank using the third address. In one embodiment, the third set of data may be written to the second flash bank at substantially the same time as first set of data is written to the first flash bank. Also, in one embodiment, a fourth address and fourth set of data may be written to the second register at substantially the same time that the first set of data is being written to the first flash bank and the third set of data is being written to the second flash bank.

BRIEF DESCRIPTION OF THE DRAWINGS

A better understanding of the present invention may be obtained when the following detailed description is considered in conjunction with the following drawings, in which.

Figure 1:
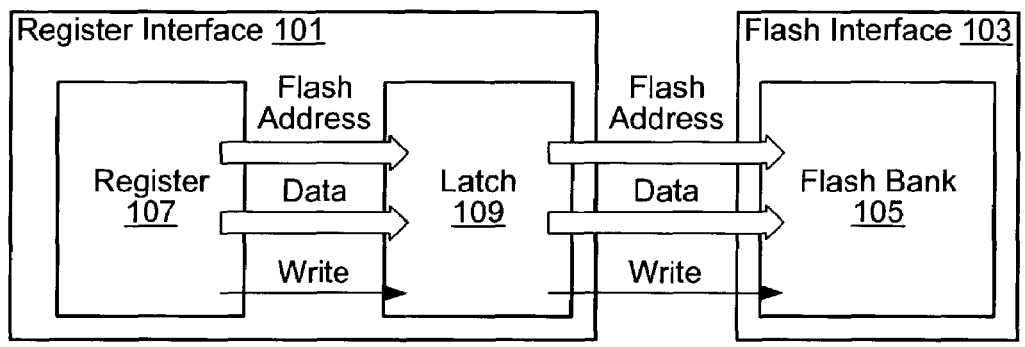
FIG. 1 illustrates a register interface coupled to a flash bank, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF THE EMBODIMENTS

FIG. 1: Register Interface Coupled to a Flash Bank

FIG. 1 illustrates an embodiment of a register interface coupled to a flash bank. In one embodiment, a register interface 101 may be coupled to a flash bank 105 in a flash interface 103. While FIG. 1 shows one flash bank 105 in the flash interface 103, a greater number of flash banks in the flash interface 103 are also contemplated. In one embodiment, the register interface 101 may have a register 107 and a latch 109. As used herein, the term "latch" may refer to any device for latching a register 107. In one embodiment, a "latch" may refer to a flip-flop or group of flip-flops. Other latches 109 are also contemplated.

In one embodiment, the flash bank 105 may be a 2 megabit flash (256 kilobytes) partitioned into 16 kilobyte by 32 bit sections (i.e., 64 kilobyte blocks). Other sizes and partitions are also contemplated. In one embodiment, the flash bank 105 may have a page size of 2048 bytes divided in 8 rows in which each row has 256 bytes (equivalent to 64 double words (DW)). Other page sizes are also contemplated. In one embodiment, the flash bank 105 may be used in an in-system mode (e.g., LPC mode) to support LPC memory cycles, or in an ICT mode to store chip programming during computer assembly. Other uses for the flash bank 105 are also contemplated.

In one embodiment, a first address and a first set of data may be written to the register 107. The first address and the first set of data may be transferred to the latch 109 before writing a second address and a second set of data to the register 107. In one embodiment, the first set of data may be written to the flash bank 105 from the latch 109 (using the first address). At least a portion of the second address and the second set of data may be written to the register interface 101 simultaneously with the writing of the first set of data to the flash bank 105. Because the flash bank 105 may be continuously programmed, a device using the flash bank 105 may not need to switch the flash bank in and out of a programming mode and thus may save programming time.

Figure 2:
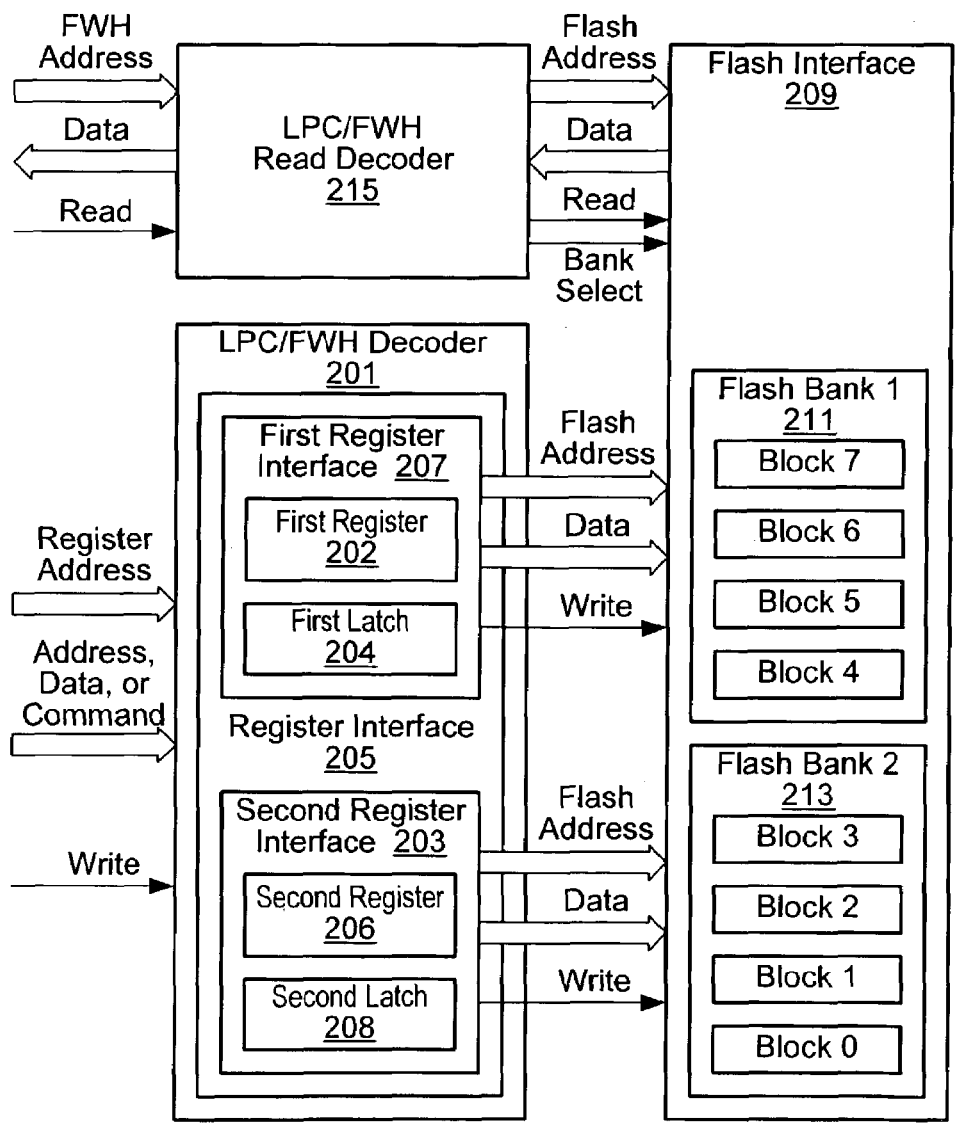
FIG. 2 illustrates two flash banks connected to a register interface in a low pin count (LPC) mode, according to one embodiment.

FIG. 2: Two Flash Banks Connected to a Register Interface

FIG. 2 illustrates an embodiment of two flash banks connected to a register interface. In one embodiment, the first flash bank 211 may be coupled to a first register interface 207, and the second flash bank 213 may be coupled to a second register interface 203. The first register interface 207 and the second register interface 203 may be part of a register interface 205 in an LPC/FWH decoder 201. In one embodiment, the first register interface 207 may have a first register 202 and a first latch 204. The second register interface 203 may have a second register 206 and a second latch 208. Other register interface configurations are also contemplated. In one embodiment, the first flash bank 211 and the second flash bank 213 may be part of a flash interface 209 coupled to an LPC/FWH read decoder 215. In one embodiment, the LPC/FWH read decoder 215 may access the flash interface 209 through an LPC bus (not shown). Other flash bank/register interface arrangements are also contemplated.

In one embodiment, the flash interface may also have additional bits (i.e., pins). For example, a reset pin, such as FWH_RST# pin (not shown) may be set to a logic low (0) during a computer system reset to initialize the flash interface 209 with a central processing unit in the computer system. In one embodiment, an FWH_IC pin (interface configuration pin) (not shown) may be set to logic high (1) to put the flash banks in an. ICT mode or a logic low (0) to put the flash banks in an in-system programming mode (i.e., to read/write LPC memory cycles and FWH memory cycles during normal computer system use). Other methods of selecting between the ICT and in-system mode are also contemplated. In one embodiment, a FWHSEL pin and a FWH_IDO pin may be used to select between decoding FWH memory cycles and LPC memory cycles in the flash banks (i.e., by the LPC/FWH read decoder). For example, if the FWHSEL pin is set to 0, FWH memory cycles may be decoded. If the FWH_IDO pin is set to 0 and the FWHSEL pin is set to 1, LPC memory cycles may be decoded. If the FWH_IDO pin and the FWHSEL pin are set to 1, neither FWH memory cycles nor LPC memory cycles may be decoded. Other pins and memory cycles are also contemplated.

Figure 3:
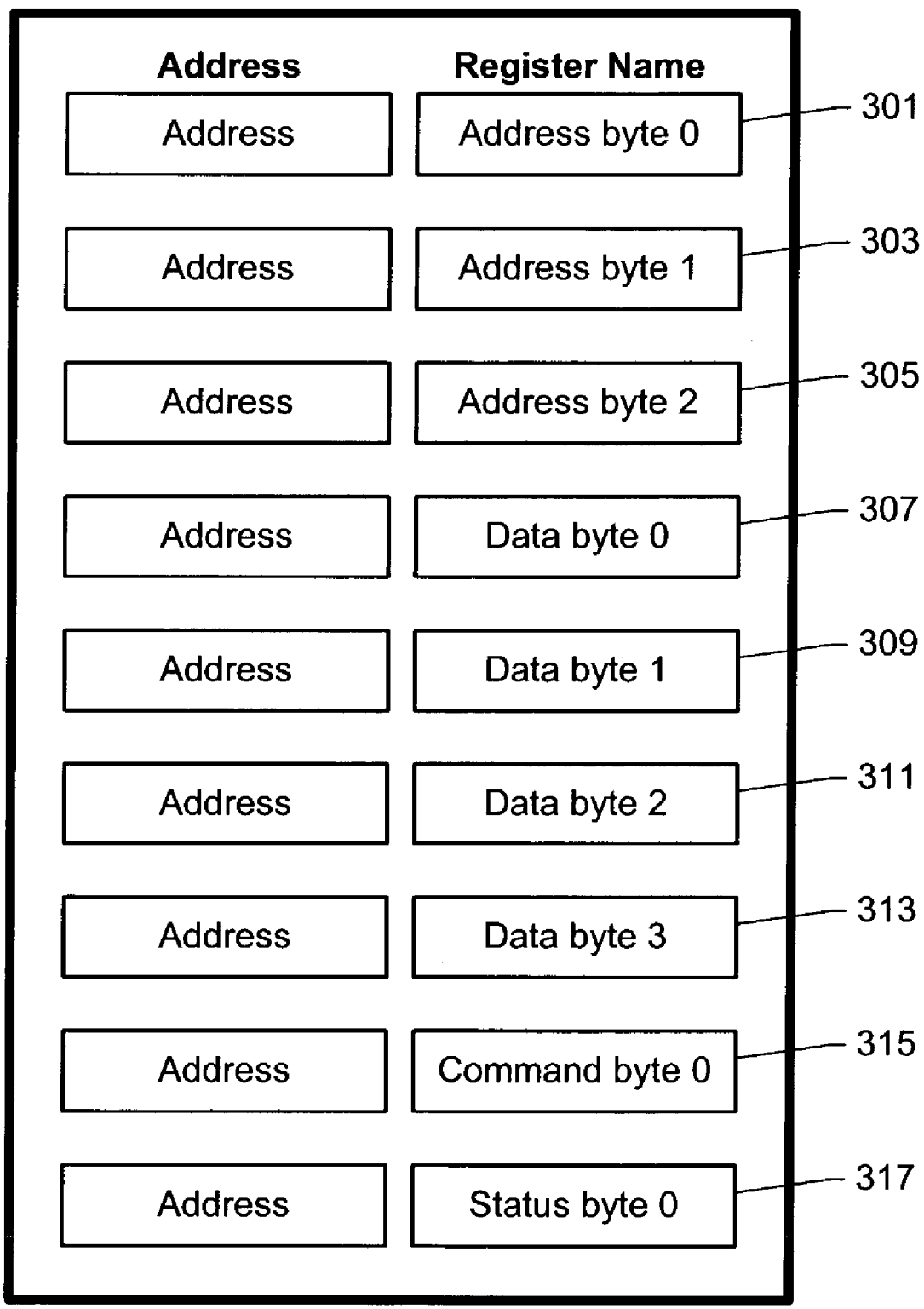
FIG. 3 illustrates the first register interface with address, data, command, and status bytes, according to one embodiment.

FIG. 3: A First Register Interface With Address, Data, Command, and Status Bytes FIG. 3 illustrates an embodiment of a first register interface with address, data, command, and status bytes. In one embodiment, each byte shown may be divided into 8 bits. Also, in one embodiment, the address bytes 301, 303, and 305 and the data bytes 307, 309, 311, and 313 may be written from the first register interface to the first flash bank when the command byte 315 is written to the first register interface. Other signals are also contemplated.

In one embodiment, a status byte 317 in the first register interface (and the second register interface) may be comprised of 8 bits. Among the 8 bits, one bit may be a busy bit (for a 0 or 1) and one bit may be a command pending bit (for a 0 or 1). In one embodiment, the busy bit and the command pending bit may be used to indicate when the register interface may be written to during LPC mode. For example, in one embodiment, if the command pending bit in the first register interface is a 0, an address and a set of data may be written to the first register interface. In one embodiment, while the command pending bit is a 0, a 0 may be written to the busy bit in the first register interface to indicate the first register interface is idle, and a 1 may be written to the busy bit in the first register interface to indicate the second register interface may be executing a command (e.g., to write). In either instance of the busy bit, in one embodiment, if the command pending bit in the first register interface is a 0, the first register interface may have an address and a set of data written to it.

In one embodiment, if the command pending bit in the first register interface is a 1, the first register interface may not be written to. For example, while the command pending bit is a 1, a 0 in the busy bit may indicate that the first register interface has just finished a command, but another command is pending. A 1 in the command pending bit and a 1 in the busy bit may indicate a command is in the process of being executed (e.g., data is being written from the first register interface to the first flash bank). In one embodiment, if the command pending bit is a 1, the register interface may not be written to regardless of the value of the busy bit. A 1 in the command pending bit may indicate that data is being written from the first register interface, and therefore, the first register interface may not receive new data. Other bits and indicators are also contemplated.

In one embodiment of the ICT mode, the status byte and command pending bit may not be used. Instead, in ICT mode, the flash bank may be programmed with direct transfers from the register interface. In one embodiment, the register interface may use an ICT write control. In one embodiment, an ICT programming device may use internal timing to insure that the register interface is not overwritten before data in the register interface is written to the flash bank. Other embodiments of the ICT mode are also contemplated. For example, the status byte and the command pending bit may also be used in the ICT mode.

Figure 4:
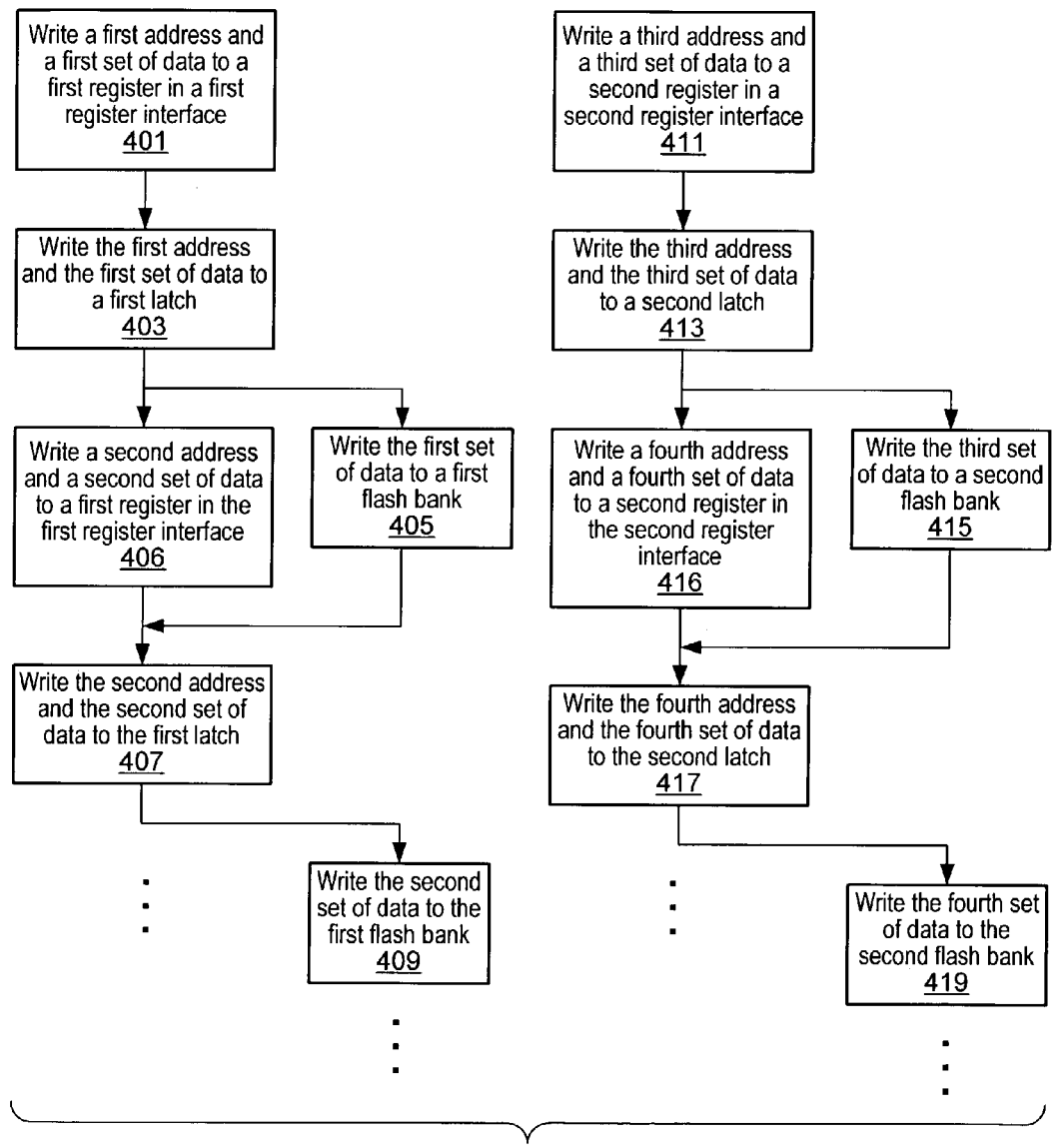
FIG. 4 illustrates a flowchart for a double buffered flash bank in LPC mode, according to one embodiment.

FIG. 4: A Flowchart for a Double Buffer Flash Bank

FIG. 4 is a flowchart illustrating an embodiment for a double buffered flash bank. In one embodiment, the first flash bank and the second flash bank may be written to using the first register interface and the second register interface. It should be noted that in various embodiments of the methods described below, one or more of the steps described may be performed concurrently, in a different order than shown, or may be omitted entirely. Other additional steps may also be performed as desired.

At 401, a first address and a first set of data may be written to a first register interface. For example, the first address and the first set of data may be written to a first register in the first register interface. In one embodiment, the first register interface may be part of a register interface in an LPC/FWH decoder.

At 403, the first address and the first set of data may be written to a first latch in the first register interface. For example, the first address and first set of data may be temporarily stored in flip-flops coupled to the first register in the first register interface. In one embodiment, the first address and the first set of data may be transferred from the first register to the first latch. In another embodiment, the first address and the first set of data may be written simultaneously to the first register and the first latch. Other writes to the first latch are also contemplated.

At 405, the first set of data may be written to the first flash bank using the first address. For example, the first address may be used to place the first set of data in the first flash bank.

At 406, a second address and a second set of data may be written to the first register in the first register interface. In one embodiment, at least a portion of the second address and the second set of data may be written simultaneously with the writing of the first set of data to the first flash bank from the first latch. Thus, at least a portion of 405 and 406 may be performed simultaneously or concurrently. In one embodiment, virtually all of 405 and 406 are performed concurrently.

At 407, the second address and the second set of data may be written to the first latch. In one embodiment, the second address and the second set of data may not be written to the first latch until the first set of data is written to the first flash bank from the first latch.

At 409, the second set of data may be written to the first flash bank using the second address. For example, the second address may be used to place the second set of data in the first flash bank.

At 411, a third address and a third set of data may be written to the second register in the second register interface. In one embodiment, the third address and the third set of data may be written to the second register in the second register interface after the first address and the first set of data are written to the first register interface. In one embodiment, the third address and the third set of data may be written to the second register in the second register interface at substantially the same time as the first address and the first set of data are written to the first register interface. In one embodiment, a fourth address and a fourth set of data may be written to a third register interface.

At 413, the third address and the third set of data may be transferred from the second register to the second latch in the second register interface. In one embodiment, the third address and the third set of data may be transferred from the second register to the second latch at substantially the same time as the first address and the first set of data are transferred from the first register to the first latch. In another embodiment, the third address and the third set of data may be written to the second register, and at least a portion of the third address and the third set of data may be written to the second register simultaneously with the writing the first set of data to the first register interface.

At 415, the third set of data may be written to the second flash bank using the third address. In one embodiment, the third set of data may be written to the second flash bank at substantially the same time as the first set of data is written to the first flash bank. Also, in one embodiment, a fourth address and fourth set of data may be written to the second register at substantially the same time that the first set of data is being written to the first flash bank and the third set of data is being written to the second flash bank.

At 417, the fourth address and the fourth set of data may be written to the second latch. In one embodiment, the fourth address and the fourth set of data may be written to the second latch at substantially the same time that the second address and second set of data are written to the first latch.

At 419, the fourth set of data may be written to the second flash bank. In one embodiment, the fourth set of data may be written to the second flash bank at substantially the same time that the second set of data is written to the first flash bank.

In one embodiment, the first set of data may be read from the first flash bank, and the third set of data may be read from the second flash bank. In one embodiment, an LPC/FWH read decoder may read the first set of data and/or the third set of data from a flash interface comprised of the first flash bank and the second flash bank. For example, as the third set of data is written to the second flash bank, the computer system may read the first set of data at the first address in the first flash bank. The computer system may also read the third set of data at the third address in the second flash bank. Other read orders are also contemplated. The above process of writing to the register interfaces, writing to the flash banks, and reading out of the flash banks may be continuously repeated as needed. In other words, data may be continuously provided to a computer system in a double buffered fashion.

Figure 5:
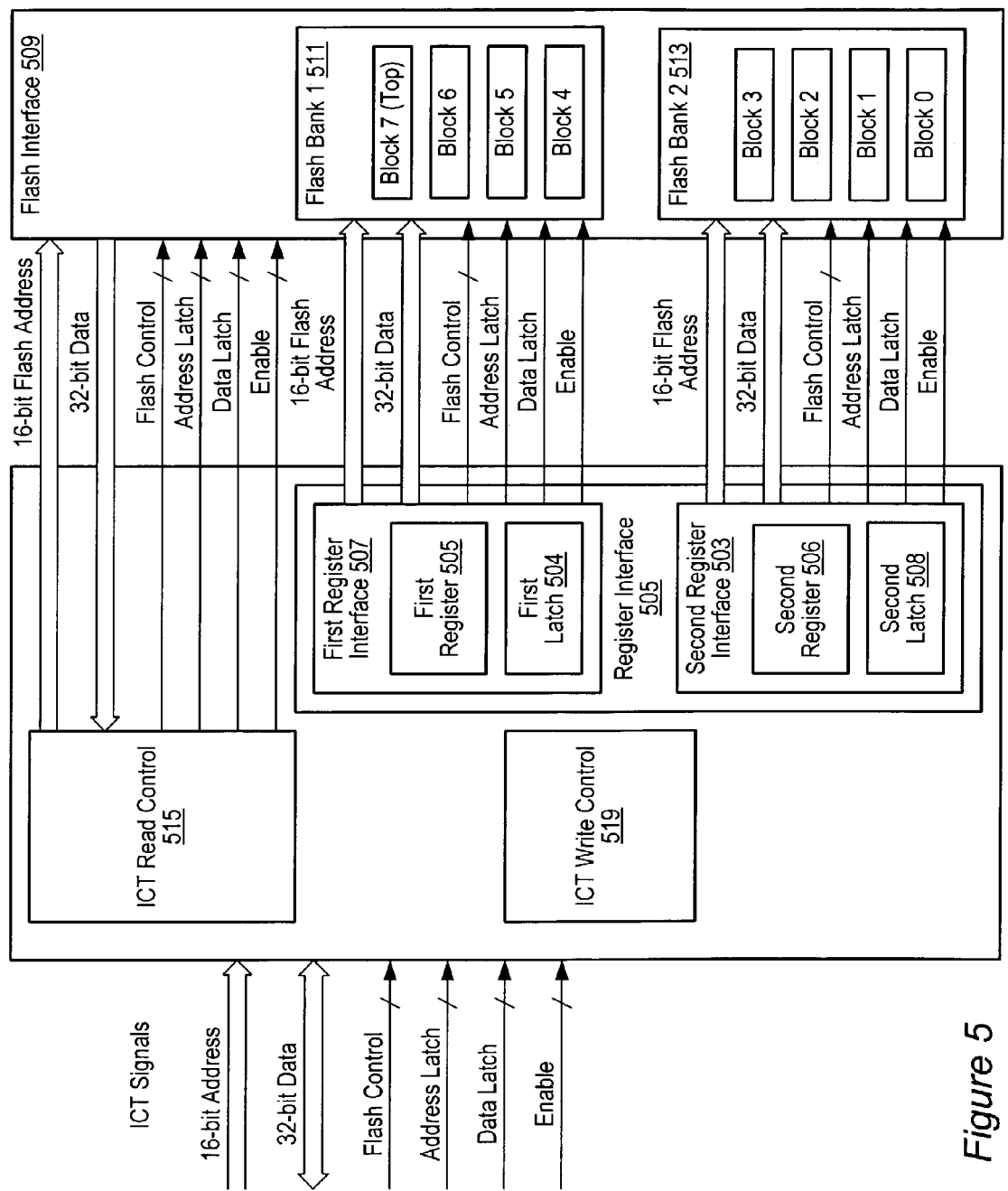
FIG. 5 illustrates a register interface coupled to a flash interface in an in circuit tester (ICT) mode, according to one embodiment.

FIG. 5: Double Buffer Flash Bank in an ICT Mode

FIG. 5 illustrates an embodiment of a register interface coupled to a flash interface in an ICT mode. In one embodiment, a register interface 505 may not be part of an LPC decoder. In one embodiment an ICT programming device may write data directly to the first register interface 507, comprised of a first register 505 and a first latch 504, and to the second register interface 503, comprised of a second register 506 and a second latch 508. In one embodiment, writes to the register interface may be controlled by an ICT write control device 519. In one embodiment, the first flash bank 511 and the second flash bank 513 in the flash interface 509 may be read by an ICT read control 515. In one embodiment, the flash banks may continuously have new sets of data written to them from the register interface until the flash banks are fully programmed. Other programming modes for the flash banks are also contemplated.

Figure 6:
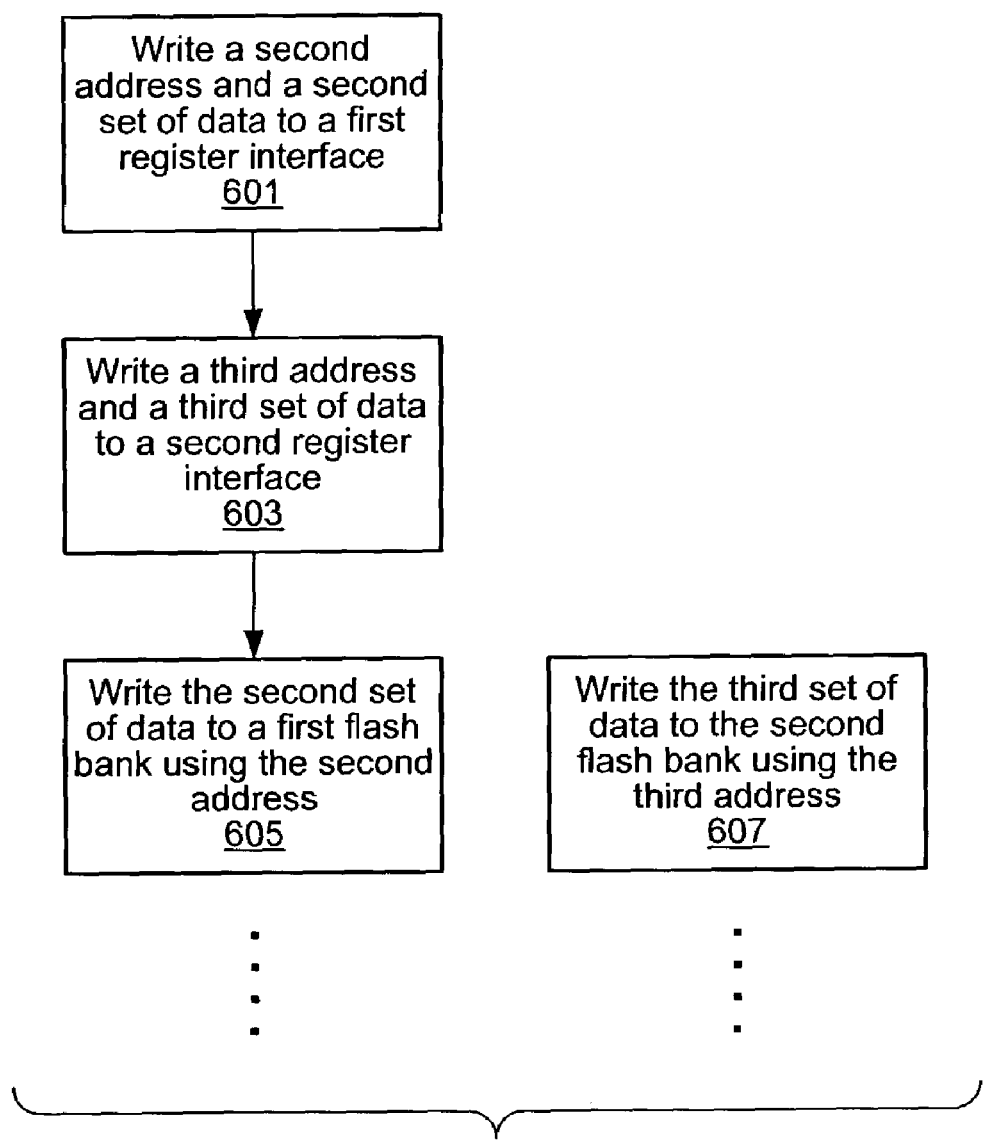
FIG. 6 illustrates a flowchart for a double buffered flash bank in an ICT mode, according to one embodiment.

FIG. 6: Flowchart for a Double Buffer Flash Bank in an ICT Mode

FIG. 6 is a flowchart illustrating an embodiment for a double buffered flash bank in an ICT mode. In one embodiment, data may be written to both the first register interface and the second register interface before the data is written to the corresponding first flash bank and second flash bank. It should be noted that in various embodiments of the methods described below, one or more of the steps described may be performed concurrently, in a different order than shown, or may be omitted entirely. Other additional steps may also be performed as desired.

At 601, a second address and a second set of data may be written to a first register interface, and at 603, a third address and a third set of data may be written to the second register interface.

At 605, the second set of data may be written to a first flash bank using the second address, and at 607, the third set of data may be written to the second flash bank using the third address. In one embodiment, the second set of data may be written to the first flash bank at substantially the same time that the third set of data is written to the second flash bank. In one embodiment, the process of writing to the register interface and writing to the flash banks may be repeated until the rows of the flash banks are programmed (i.e., filled with data). In one embodiment, after the flash banks are filled, the flash banks may be read using an ICT read control device to verify the data stored in the flash banks. Because the flash banks can stay in programming mode (i.e., the flash banks may not need to be verified after each write from the register interfaces), programming the flash banks may be performed quicker and more efficiently than if the register interfaces were not latched.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
   writing a first address and a first set of data to a register interface;
   writing the first set of data from the register interface to a first flash bank using the first address; and
   writing a second address and a second set of data to the register interface, wherein at least a portion of the writing the second address and the second set of data to the register interface is performed simultaneously with the writing the first set of data from the register interface to the first flash bank.

2. The method of claim 1,
   wherein the register interface further comprises a register and a latch, wherein the writing the first address and the first set of data to the register interface comprises writing the first address and the first set of data to the register.

3. The method of claim 2, further comprising:
   transferring the first address and the first set of data from the register to the latch before the writing the second address and the second set of data to the register interface.

4. The method of claim 1,
   wherein the register interface further comprises a first register interface coupled to the first flash bank and a second register interface coupled to a second flash bank.

5. The method of claim 4,
   wherein the writing the first address and the first set of data to the register interface comprises writing the first address and the first set of data to the first register interface, and wherein writing the first set of data from the register interface to the first flash bank using the first address comprises writing the first set of data from the first register interface to the first flash bank using the first address.

6. The method of claim 5, further comprising:
   writing a third address and a third set of data to the second register interface.

7. The method of claim 6,
   wherein the first register interface further comprises a first register and a first latch, and the second register interface further comprises a second register and a second latch.

8. The method of claim 7,
   wherein the writing the first address and the first set of data to the first register interface further comprises:
   writing the first address and the first set of data to the first register; and
   transferring the first address and the first set of data from the first register to the first latch, wherein the transferring the first address and the first set of data from the first register to the first latch occurs before the writing of the second address and the second set of data to the first register interface.

9. The method of claim 8,
   wherein writing the third address and the third set of data to the second register interface further comprises writing the third address and the third set of data to the second register, wherein at least a portion of the third address and the third set of data is written to the second register simultaneously with writing the first set of data to the first register interface.

10. The method of claim 6, further comprising:
    writing the third set of data to the second flash bank.

11. The method of claim 10, further comprising:
    reading the first set of data from the first flash bank; and
    reading the third set of data from the second flash bank.

12. The method of claim 10,
    wherein at least a portion of the writing of the third set of data to the second flash bank is performed simultaneously with the writing the first set of data to the first flash bank.

13. The method of claim 6, further comprising:
    writing a command pending bit to a status register coupled to the register interface to indicate that the second set of data in the register interface or the third set of data in the register interface should be written to the first flash bank or the second flash bank.

14. The method of claim 5, further comprising:
    writing a busy bit to a status register coupled to the register interface to indicate whether the first set of data is being written to the first flash bank.

15. A system, comprising:
    a register interface;
    a first flash bank coupled to the register interface;
    a processor coupled to the register interface;

a memory coupled to the processor and configured to store program instructions executable to:
  write a first address and a first set of data to the register interface;
    write the first set of data from the register interface to the first flash bank using the first address; and
  write a second address and a second set of data to the register interface, wherein at least a portion of the writing the second address and the second set of data to the register interface is performed simultaneously with the writing the first set of data from the register interface to the first flash bank.

16. The system of claim 15,
wherein the register interface further comprises a register and a latch, wherein the writing the first address and the first set of data to the register interface comprises writing the first address and the first set of data to the register.

17. The system of claim 16,
wherein the program instructions are further executable to transfer the first address and the first set of data from the register to the latch before the writing the second address and the second set of data to the register interface.

18. The system of claim 15,
wherein the register interface further comprises a first register interface coupled to the first flash bank and a second register interface coupled to a second flash bank.

19. The system of claim 18,
wherein the writing the first address and the first set of data to the register interface comprises writing the first address and the first set of data to the first register interface, and wherein writing the first set of data from the register interface to the first flash bank using the first address comprises writing the first set of data from the first register interface to the first flash bank using the first address.

20. The system of claim 19,
wherein the program instructions are further executable to write a third address and a third set of data to the second register interface.

21. The system of claim 20,
wherein the first register interface further comprises a first register and a first latch, and the second register interface further comprises a second register and a second latch.

22. The system of claim 21,
wherein the writing the first address and the first set of data to the first register interface further comprises:
  writing the first address and the first set of data to the first register; and
transferring the first address and the first set of data from the first register to the first latch, wherein the transferring the first address and the first set of data from the first register to the first latch occurs before the writing of the second address and the second set of data to the first register interface.

23. The system of claim 22,
wherein writing the third address and the third set of data to the second register interface further comprises:
  writing the third address and the third set of data to the second register, wherein at least a portion of the writing of the third address and the third set of data to the second register is performed simultaneously with the writing of the first set of data to the first flash bank.

24. The system of claim 19,
wherein the program instructions are further executable to write a busy bit to a status register coupled to the register interface to indicate whether the first set of data is being written to the first flash bank.

25. The system of claim 20,
wherein the program instructions are further executable to:
  write the third set of data to the second flash bank.

26. The system of claim 25,
wherein the program instructions are further executable to:
  read the first set of data from the first flash bank; and
  read the third set of data from the second flash bank.

27. The system of claim 25,
wherein at least a portion of the writing of the third set of data to the second flash bank is performed simultaneously with the writing the first set of data to the first flash bank.

28. The system of claim 20,
wherein the program instructions are further executable to write a command pending bit to a status register coupled to the register interface to indicate that the second set of data in the register interface or the third set of data in the register interface should be written to the first flash bank or the second flash bank.

29. The system of claim 28,
wherein the first register interface is coupled to a first status register with a first command pending bit to indicate that the second set of data should be written to the first flash bank and the second register interface is coupled to a second status register with a second command pending bit to indicate that the third set of data should be written to the second flash bank.

30. A system, comprising:
a means for writing a first address and a first set of data to a register interface;
a means for writing the first set of data from the register interface to a first flash bank using the first address; and
a means for writing a second address and a second set of data to the register interface, wherein at least a portion of the writing the second address and the second set of data to the register interface is performed simultaneously with the writing the first set of data from the register interface to the first flash bank.

31. A computer readable memory medium comprising program instructions, wherein the program instructions are computer-executable to:
write a first address and a first set of data to a register interface;
write the first set of data from the register interface to a first flash bank using the first address; and
write a second address and a second set of data to the register interface, wherein at least a portion of the writing the second address and the second set of data to the register interface is performed simultaneously with the writing the first set of data from the register interface to the first flash bank.

32. A method, comprising:
writing a first address and a first set of data to a first register interface;
writing a second address and a second set of data to a second register interface, wherein at least a portion of the second address and the second set of data is written to the second register interface simultaneously with writing the first address and the first set of data to the first register interface;

writing the first set of data to a first flash bank;
writing the second set of data to a second flash bank; and
wherein at least a portion of the writing of the second set of data to the second flash bank is performed simultaneously with the writing the first set of data to the first flash bank.

33. The method of claim 32,
wherein the first register interface further comprises a first register and a first latch, and the second register interface further comprises a second register and a second latch;
wherein writing the first address and the first set of data to the first register interface comprises writing the first address and the first set of data to the first register and transferring the first address and the first set of data from the first register to the first latch;
wherein writing the second address and the second set of data to the second register interface comprises writing the second address and the second set of data to the second register and transferring the second address and the second set of data from the second register to the second latch; and
wherein the second address and the second set of data are transferred from the second register to the second latch simultaneously with transferring the first address and the first set of data from the first register to the first latch.

34. A method, comprising:
writing a first address and a first set of data to a register interface;
writing the first set of data from the register interface to a first flash bank using the first address;
writing a second address and a second set of data to the register interface, wherein at least a portion of the writing the second address and the second set of data to the register interface is preformed simultaneously with the writing the first set of data from the register interface to the first flash bank, wherein the register interface further comprises a first register interface coupled to the first flash bank and a second register interface coupled to a second flash bank; and
writing a third address and a third set of data to the second register interface, wherein at least a portion of the third address and the third set of data is written to the second register interface simultaneously with writing the first set of data to the first register interface.

* * * * *